(12) United States Patent
Suzuki et al.

(10) Patent No.: US 8,824,065 B2
(45) Date of Patent: Sep. 2, 2014

(54) IMAGING LENS

(75) Inventors: Hisanori Suzuki, Sukagawa (JP); Shingo Watanabe, Sukagawa (JP); Ichiro Kurihara, Sukagawa (JP); Kazuo Matsuoka, Saitama (JP)

(73) Assignee: Kantatsu Co., Ltd., Tochigi (JP)

( * ) Notice: Subject to any disclaimer, the term of this patent is extended or adjusted under 35 U.S.C. 154(b) by 601 days.

(21) Appl. No.: 13/168,430

(22) Filed: Jun. 24, 2011

(65) Prior Publication Data

US 2011/0255177 A1 Oct. 20, 2011

Related U.S. Application Data

(63) Continuation of application No. PCT/JP2009/071224, filed on Dec. 21, 2009.

(30) Foreign Application Priority Data

Dec. 24, 2008 (JP) ................. 2008-327648

(51) Int. Cl.
*G02B 3/02* (2006.01)
*G02B 9/08* (2006.01)
*G02B 13/00* (2006.01)
*G02B 27/00* (2006.01)
*G02B 13/18* (2006.01)
*G02B 27/42* (2006.01)
*G02B 5/18* (2006.01)

(52) U.S. Cl.
CPC ........ *G02B 13/0025* (2013.01); *G02B 27/0037* (2013.01); *G02B 13/18* (2013.01); *G02B 27/4211* (2013.01); *G02B 5/1895* (2013.01)
USPC .......................................... 359/718; 359/739

(58) Field of Classification Search
USPC ................................... 359/642, 708, 718, 739
See application file for complete search history.

(56) References Cited

U.S. PATENT DOCUMENTS

| 5,949,577 | A | 9/1999 | Ogata |
| 6,055,105 | A | 4/2000 | Boku et al. |
| 7,339,752 | B2 | 3/2008 | Zeng et al. |

FOREIGN PATENT DOCUMENTS

| CN | 1746716 A | 3/2006 |
| JP | 10-073760 A | 3/1998 |

(Continued)

OTHER PUBLICATIONS

English Translation of Chinese Office Action dated Mar. 27, 2013, of corresponding Chinese Application No. 200980157687.7. (4 pages).

(Continued)

*Primary Examiner* — William Choi
(74) *Attorney, Agent, or Firm* — Westerman, Hattori, Daniels & Adrian, LLP

(57) ABSTRACT

A concave surface is formed on an object side of a plastic lens of a one-piece construction, and a convex surface is formed on an image-point side thereof. The concave and convex surfaces are aspherical. A diffractive optical surface that exerts a chromatic dispersion ability is formed on the convex surface, and conditional expressions (1) 0.45<L/R<0.95 and (2) −0.065<L'(1−n)/R'<0.035n are met, where assuming that a position at which a chief ray and an optical axis intersect is regarded as an apparent stop, L denotes a distance to the apparent stop seen from the apex of the convex surface, L' denotes a distance to the apparent stop seen from the apex of the concave surface, R denotes a curvature radius of the convex surface, R' denotes a curvature radius of the concave surface, and n denotes a refractive index of a lens material.

2 Claims, 8 Drawing Sheets

(56) References Cited

FOREIGN PATENT DOCUMENTS

| | | |
|---|---|---|
| JP | 10-090596 A | 4/1998 |
| JP | 10-213739 A | 8/1998 |
| JP | 11-352397 A | 12/1999 |
| JP | 2000-028913 A | 1/2000 |
| JP | 2005-284153 A | 10/2005 |
| JP | 2005-326682 A | 11/2005 |
| JP | 2006-079059 A | 3/2006 |
| JP | 2007-298719 A | 11/2007 |
| JP | 2008-216470 A | 9/2008 |
| JP | 2008216470 A * | 9/2008 |

OTHER PUBLICATIONS

Chinese Office Action dated Mar. 27, 2013, issued in corresponding Chinese Patent Application No. 200980157687.7 (6 pages).

International Search Report of PCT/JP2009/071224, date of mailing Mar. 16, 2010.

* cited by examiner

IMAGING LENS

The present application is based on and claims priority of International application No. PCT/JP2009/071224 filed on Dec. 21, 2009, the entire contents of which are hereby incorporated by reference.

BACKGROUND OF THE INVENTION

1. Field of the Invention

The present invention relates to a compact imaging lens to be mounted in a portable cellular phone or the like, or more particularly, to an imaging lens for imaging an object of broadband light such as white light and a wide angle of view.

2. Description of the Related Art

In recent years, miniaturization of imaging lenses has rapidly progressed along with a transition from photographic film to an image sensor such as a CCD or CMOS, and mounting the imaging lens in a portable cellular phone or the like has come to be achieved. While there is an increasing demand for inexpensiveness due to mass consumption, a technological assignment such as realization of extreme thinness or restrictions specific to electronic light receiving elements has to be satisfied.

Specifically, in recent years, the imaging lens to be mounted in the portable cellular phone or the like has become compact and been requested to offer higher performance of a higher resolution in terms of a resolution or image definition. For satisfying the request, a glass or plastic lens of a two- to four-piece construction has become, as described in patent document 1 (JP-A-2007-298719), patent document 2 (JP-A-2005-326682), and patent document 3 (JP-A-2005-284153), a mainstream of the compact imaging lens to be mounted in the portable cellular phone or the like.

SUMMARY OF THE INVENTION

Imaging lenses described in the patent documents 1 to 3 are such that plural lenses are combined in order to compensate a spherical aberration or curvature of field of the lenses. The larger the number of lenses is, the higher the cost is. In addition, it becomes a factor of hindering compactness. Further, productivity is degraded. In contrast, while prevalence of a portable cellular phone or the like makes rapid progress, there is an increasing demand for a compact and inexpensive imaging lens, which is superb in productivity, even if the lens slightly compromises over image quality. In terms of the cost, it is more advantageous to decrease the number of lenses. In the imaging lens to be mounted in the portable cellular phone or the like, if an imaging lens of a one-piece construction is adopted, further compactness can be achieved and a quite advantage is won in terms of the cost. However, the imaging lens of the one-piece construction hardly, in practice, has freedom in compensating chromatic aberrations or a curvature of field or in optimizing an incident ray angle for an electronic light receiving element. This poses a problem in that optical performance cannot be ensured.

The present invention addresses the foregoing problem. An object of the present invention is to provide a practical imaging lens capable of, despite a minimal construction of one piece, compensating chromatic aberrations, compensating a curvature of field to a permissible extent, and providing an optimal incident angle for a light receiving element.

An imaging lens set forth in a first aspect of the invention includes a control member that adjusts an amount of light incident on the lens, and a one-piece plastic lens. Herein, the control member and one-piece plastic lens are arranged in that order from the side of an object. A concave surface is formed on the object side of the lens, and a convex surface is formed on the image-point side thereof. The surfaces are constructed with aspherical surfaces. The convex surface is a diffractive optical surface that exerts a color dispersion ability.

An imaging lens set forth in a second aspect of the invention, in a coordinate system in which an object direction from a reference point is negative and an image-plane direction is positive, optical elements are constructed to meet conditional expressions presented below:

$$0.45 < L/R < 0.95 \tag{1}$$

$$-0.065 < L'(1-n)/R' < 0.035n \tag{2}$$

where L denotes a distance to an apparent stop seen from the apex of the convex surface on the assumption that a position at which a chief ray and an optical axis intersect is regarded as the apparent stop, L' denotes a distance to the apparent stop seen from the apex of the concave surface on the assumption that the position at which the chief ray and optical axis intersect is regarded as the apparent stop, R denotes a curvature radius of the convex surface, R' denotes a curvature radius of the concave surface, and n denotes a refractive index of a lens material.

DETAILED DESCRIPTION OF THE PREFERRED EMBODIMENTS

Embodiments of the present invention will be described below in conjunction with the drawings. To begin with, an embodiment 1 will be described as a typical example of the present invention. In subsequent embodiments, an iterative description will be omitted.

First Embodiment

Figure 1:
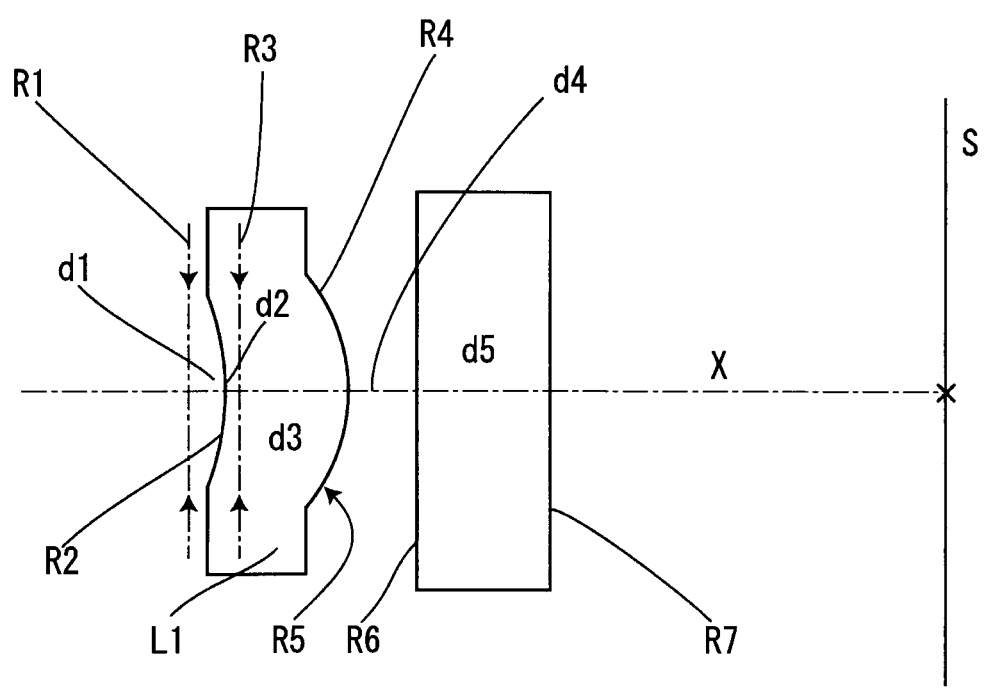
FIG. 1 is a construction diagram of an imaging lens in accordance with a first embodiment.
Figure 2:
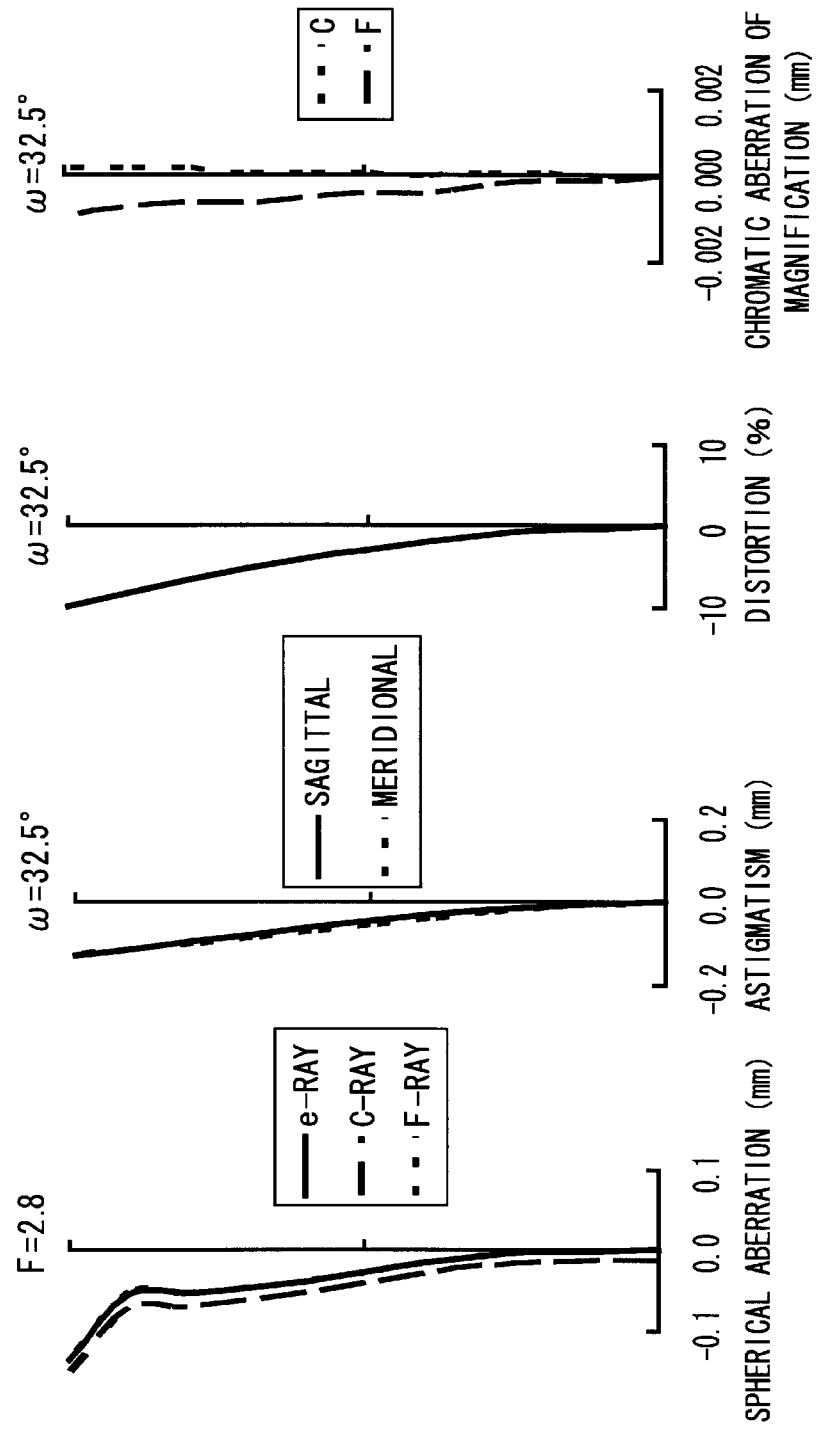
FIG. 2 includes aberration diagrams of the imaging lens in accordance with the first embodiment.

FIG. 1 and FIG. 2 show a first embodiment of the present invention. FIG. 1 is a construction diagram of an imaging lens, and FIG. 2 includes aberration diagrams. As shown in FIG. 1, a fundamental construction of the present embodiment is such that: a lens frame R1 is placed as a control member, which adjusts an amount of light incident on the lens, on the side of an object; and an imaging lens L1 of a one-piece construction is placed behind the lens frame R1. The imaging lens L1 has a concave surface R2 formed on an object side thereof and a convex surface R4 formed on an image-point side thereof. The concave surface R2 and convex surface R4 are constructed with aspherical surfaces, and the convex surface R4 is formed with a diffractive optical surface R5 having a chromatic dispersion ability. For the imaging lens L1, cycloolefin plastic is adopted as a material in order to facilitate formation of the aspherical surfaces.

In addition, in the present embodiment, a cover glass composed of parallel planes R6 and R7 is interposed between the convex surface R4 of the imaging lens L1 and an image formation plane S. In FIG. 1, reference numerals d1, d2, etc., and d5 denote surface spaces, and X denotes an optical axis. A position at which a chief ray and the optical axis intersect is regarded as an apparent stop position and defined as a virtual surface R3.

Mathematics 1 presents an aspherical shape expression for the aspherical surfaces that construct the concave surface R2 and convex surface R4 of the imaging lens L1. Mathematics 2 presents an optical path difference function implemented to form the diffractive optical surface R5 on the aspherical surface.

$$z = \frac{\frac{Y^2}{R}}{1 + \sqrt{1 - K \times \frac{Y^2}{R^2}}} + \sum_{i=2}^{10} A_{2i} \times Y^{2i}$$

[Mathematics 1]

where Z denotes a transition from the optical axis in an X-axis direction (an image-plane direction is positive), Y denotes a height from the optical axis, $A_{2i}$ denotes an aspherical coefficient (where i ranges from 1 to 10), K denotes an eccentricity, and R denotes a paraxial radius of curvature of an aspherical surface.

$$P = \sum_{i=1}^{5} B_{2i} Y^{2i}$$

[Mathematics 2]

where P denotes an optical path difference (unit: wavelength), and $B_{2i}$ denotes an optical path difference function coefficient (i ranges from 1 to 5).

The imaging lens L1 of the first embodiment is constructed to meet conditional expressions (1) and (2) shown in Mathematics 3 below.

[Mathematics 3]

$$0.45 < L/R < 0/95 \quad (1)$$

$$-0.065 < L'(1-n)/R' < 0.035n \quad (2)$$

where: L denotes a distance to the virtual surface R3 (apparent stop) seen from the apex of the convex surface R4 on the assumption that the position at which the chief ray and optical axis intersect is regarded as the virtual surface R3 (apparent stop), equals d3, and has a negative sign; L' denotes a distance to the virtual surface R3 (apparent stop) seen from the apex of the concave surface R2 on the assumption that the position at which the chief ray and optical axis intersect is regarded as the virtual surface R3 (apparent stop), and equals d2; R denotes a curvature radius of the convex surface R4; R' denotes a curvature radius of the concave surface R2; and n denotes a refractive index of a lens material.

Table 1 lists the radii of curvature R (mm) of lenses of the first embodiment, the surface spaces d (mm) on the optical axis of the surfaces thereof, the refractive indices $N_d$ relative to a d-line of lens materials thereof, and Abbe numbers $\upsilon_d$ thereof. A focal length f of an entire system of the first embodiment, an F-number thereof, a half angle of view ω thereof, and values corresponding to the conditional expressions (1) and (2) thereof are listed below the table. In Table 1 and subsequent tables, a number associated with the symbols sequentially increments along with a transition from the object side.

TABLE 1

| Surface | R | d | $N_d$ | $\upsilon_d$ |
|---|---|---|---|---|
| 1 Lens frame | ∞ | 0.0500 | | |
| 2 (aspherical surface) | −1.2644 | 0.0425 | 1.52511 | 56.2 |
| 3 Stop | ∞ | 0.3305 | 1.52511 | 56.2 |
| 4 (diffractive optical surface) | −0.5786 | 0.5000 | | |
| 5 | ∞ | 0.4000 | 1.51680 | 64.2 |
| 6 | ∞ | (0.9147) | | | f = 1.568
Fno = 2.8
ω = 32.5°
L/R = 0.573
L' (1 − n)/R' = 0.0177

Table 2 lists values of aspherical coefficients in the first embodiment, and values of constants of an optical path difference function on the diffractive optical surface therein.

TABLE 2

| Aspherical surface (second surface) Aspherical coefficients | |
|---|---|
| K = | 0.1149 |
| $A_4$ = | −2.0712757 |
| $A_6$ = | 11.927385 |
| $A_8$ = | −372.36610 |
| $A_{10}$ = | 3127.3959 |
| $A_{12}$ = | −13132.322 |
| Diffractive optical surface (fourth surface) Aspherical coefficients | |
| K = | 0.1149 |
| $A_4$ = | 2.0712757 |
| $A_6$ = | 11.927385 |
| $A_8$ = | 372.36610 |
| $A_{10}$ = | 3127.3959 |
| $A_{12}$ = | 13132.322 |
| Optical path difference function coefficients | |
| $B_2$ = | 39.524873 |
| $B_4$ = | 12.085727 |
| $B_6$ = | −174.08838 |
| Optimal wavelength for the optical path difference function | |
| $\lambda_0$ = | 530 nm |

As mentioned above, the present embodiment has the fundamental construction in which: the lens frame R1 is placed on the side of an object as a control member that adjusts an amount of light; and the one-piece imaging lens L1 is placed behind the lens frame, and is thus intended to accomplish compactness and reduce a cost of manufacture. In general, it is well known that when the lens L1 of a one-piece construction is used to minimize aberrations, the lens L1 is shaped similarly to a plano-convex lens whose convex surface is oriented to the side of the object, and a stop is preferably defined in the inside of the lens. However, in this construction, when a curvature of field should be decreased, there is no method other than a method of raising the refractive index of materials of lenses constituting the lens. When an angle of view gets widened, there is no freedom in an incident angle of rays falling on an image sensor. A problem of shading cannot be addressed.

In order to address the foregoing problems, a surface having a negative power and being intended to compensate a curvature of field is placed in order to diminish a Petzval sum. A surface having a positive power is located at a position appropriately away from a stop in an image-plane direction, whereby an exit angle of a chief ray from the lens can be optimized.

However, the fact that a chief ray enters a refraction surface at a large incident angle or exits at a large exit angle degrades a chromatic aberration of magnification. Together with an axial chromatic aberration, the chromatic aberration of magnification adversely affects image formation performance. The present embodiment address this problem together with the axial chromatic aberration by forming the diffractive optical surface R5, which has a chromatic dispersion ability, on the convex surface R4 having a positive power.

The diffractive optical surface R5 is constructed with a relief that brings about an optical path difference defined by an optical path difference function. While dispersion by an ordinary glass is expressed with an Abbe number relative to a d-line which ranges from 25 to 80, the dispersion by the diffractive optical surface is expressed with an Abbe number of approximately −3.5. Thus, the diffractive optical surface has the nature of exhibiting the dispersion that is about one digit larger with a reverse sign. In addition, when a typical optical material such as glass is used to compensate chromatic aberrations, a lens has to be made of at least two materials exhibiting different dispersions. Merely by placing one diffractive optical surface on the lens, the aforesaid great chromatic dispersion ability can be exerted, and chromatic aberration compensation can be achieved effectively.

In contrast, the diffractive optical surface R5 exerts very high diffraction efficiency with respect to a designed reference wavelength. However, if a wavelength deviates from the designed reference wavelength or if an incident angle of rays gets larger, a drawback that the diffraction efficiency is degraded may manifest itself. Therefore, design is requested to diminish an adverse effect of the drawback and others to the greatest possible extent.

For compensating chromatic aberrations caused by a lens system that is made of typical glass or the like but does not employ the diffractive optical surface R5, if an element to be employed in chromatic aberration compensation is of one piece, the element is generally located at a position relatively close to a stop. The diffractive optical surface R5 is also located at the position close to the stop, whereby both an axial chromatic aberration and off-axial chromatic aberration can be compensated. However, when an angle of view is large as it is in the first embodiment, a ray incident angle gets larger. This invites rapid degradation of diffraction efficiency and largely decreases a contrast in a periphery.

In the present embodiment, the diffractive optical surface R5 is placed on the convex surface R4 located farthest away from the virtual surface R3 (apparent stop) in order to cope with the large angle of view. Thus, the foregoing problem is addressed. The lens frame R1 that adjusts an amount of light incident on the lens L1 is placed on the side of an object, and the concave surface R2 is placed behind the lens frame. Assuming that a chief ray and the optical axis intersect on the virtual surface R3 (apparent stop), if the distance from the position of the virtual surface R3 (apparent stop) to the convex surface R4 is set to an optimal value, a chief-ray incident angle on the convex surface R4 is suppressed to a certain value. Degradation of diffraction efficiency due to a change in a ray incident angle of even an off-axis ray can be minimized.

By increasing the distance between the concave surface R2 and convex surface R4, the powers of the surfaces R2 and R4 can be relatively intensified. As a result, the Petzval sum decreases. Therefore, a curvature of field can be properly compensated. However, when the distance between the concave surface R2 and convex surface R4 gets larger, a chief-ray passing position on the convex surface R4 comes off the optical axis. Therefore, distortion may increase or a ray incident angle on an electronic light receiving element may get too small. Therefore, the distance has its limitation. Further, when the diffractive optical surface R5 is used to perform chromatic aberration compensation on an axial ray, an asymmetric relief is constructed for an off-axis ray. Therefore, a magnitude of occurrence of a chromatic aberration of magnification and a coma dependent on a wavelength become unbalanced. As a result, proper aberration compensation cannot be accomplished.

Due to the foregoing nature, it is essential to place the diffractive optical surface R5 on the convex surface R4. The distance between the virtual surface R3 (apparent stop) and convex surface R4 has a certain optimal value. The optimal value is defined by the conditional expression (1) in Mathematics 3. When the ratio of the distance L between the virtual surface R3 (apparent stop) and convex surface R4 to the radius of curvature R, L/R, gets smaller than 0.45, it becomes hard to simultaneously compensate an axial chromatic aberration and a chromatic aberration of magnification. In contrast, when the L/R gets larger than 0.95, although there is room for compensation of chromatic aberrations by the diffractive optical surface R5, distortion increases and an entire optical system gets larger. This is regressive against a request for compactness. The diffractive optical surface R5 brings about a decrease in a contrast because of second-order and third-order diffractions due to degradation of diffraction efficiency. However, the diffraction efficiency other than a designed reference wavelength can be minimized by optimizing an optical path difference function, and the contrast can be improved by performing electric processing involving an image sensor and subsequent elements.

The conditional expression (2) in Mathematics 3 expresses the positional relationship between the concave surface R2 and virtual surface R3 (apparent stop), and provides a quantity for retaining a coma properly and decreasing the length of an entire system. The conditional expression (2) provides a value obtained by normalizing the distance to the virtual surface R3 (apparent stop) by a refractive index, and dividing the resultant value by a refractive force of the concave surface R2. When the value of L'(1−n)/R' gets larger than 0.035n, an incident angle of an off-axis ray entering the concave surface grows, and the coma increases accordingly. When the value becomes a value that is larger in a negative direction than −0.065, it is acceptable in terms of aberration compensation. However, an exit angle of a chief ray gets smaller and deviates from an optimal value. In addition, the entire system becomes elongated. This is regressive against a request for compactness.

In the first embodiment, the distance L from the convex surface R4 to the virtual surface R3 (apparent stop) equals d3, and the distance L' from the concave surface R2 to the virtual surface R3 (apparent stop) equals d2. The radius of curvature R of the convex surface R4, the radius of curvature R' of the concave surface R2, and the refractive index n of a lens material fall within ranges of values defined by the conditional expressions (1) and (2). Therefore, using a minimum number of pieces that is one piece, chromatic aberrations and other aberrations can be compensated to be a practical level. A low-cost lens that is high in production efficiency can be provided. In particular, the present embodiment is highly advantageous in a field of an imaging lens that is mounted in a portable cellular phone and is greatly requested to be compact and inexpensive.

Second Embodiment

Figure 3:
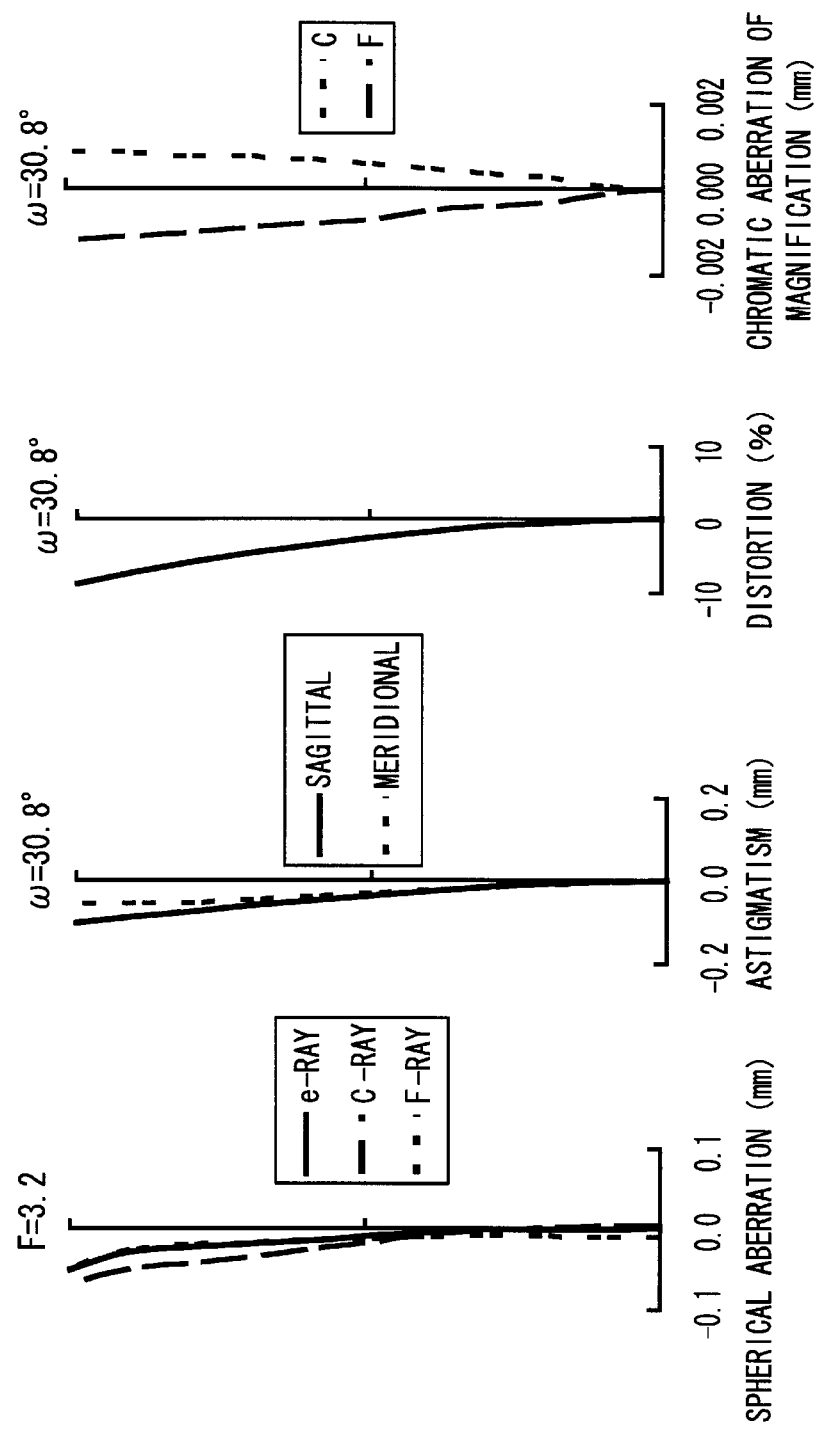
FIG. 3 includes aberration diagrams of an imaging lens in accordance with a second embodiment.

FIG. 3 includes aberration diagrams of a second embodiment. The construction of an imaging lens in accordance with the second embodiment is substantially identical to that in accordance with the first embodiment. An iterative description will be omitted. Although the center thickness of the lens is large, a distance between a convex surface and an apparent stop is short.

Table 3 lists radii of curvature R (mm) of lenses of the second embodiment, surface spaces d (mm) on an optical axis of surfaces thereof, refractive indices $N_d$ relative to a d-line of lens materials thereof, and Abbe numbers $\upsilon_d$ thereof. A focal length f of an entire system of the second embodiment, an F-number, and a half angle of view ω thereof, and values corresponding to the conditional expressions (1) and (2) thereof are listed below Table 3.

TABLE 3

| Surface | R | d | $N_d$ | $\upsilon_d$ |
|---|---|---|---|---|
| 1 Lens frame | ∞ | 0.0300 | | |
| 2 (aspherical surface) | −1.3728 | 0.1222 | 1.52511 | 56.2 |
| 3 Stop | ∞ | 0.3060 | 1.52511 | 56.2 |
| 4 (diffractive optical surface) | −0.5991 | 0.5000 | | |
| 5 | ∞ | 0.4000 | 1.51680 | 64.2 |
| 6 | ∞ | (1.0535) | | | f = 1.640
Fno = 3.2
ω = 30.8°
L/R = 0.511
L' (1 − n)/R' = 0.0467

Table 4 lists values of aspherical coefficients employed in the second embodiment, and values of constants of an optical path difference function on a diffractive optical surface threin.

TABLE 4

| Aspherical surface (second surface) Aspherical coefficient | |
|---|---|
| K = | 0.0000 |
| $A_4$ = | −1.62933373 |
| $A_6$ = | 4.2709449 |
| $A_8$ = | −88.107307 |
| $A_{10}$ = | 59.240915 |
| Diffractive optical surface (fourth surface) Aspherical coefficient | |
| K = | 1.1571 |
| $A_4$ = | −0.4836378 |
| $A_6$ = | −2.1471811 |
| $A_8$ = | 3.7667218 |
| $A_{10}$ = | −139.66559 |
| Optical path difference function coefficient | |
| $B_2$ = | −15.542612 |
| $B_4$ = | −477.64061 |
| $B_6$ = | 2544.8653 |
| Optimal wavelength for the optical path difference function | |
| $\lambda_0$ = | 546 nm |

Third Embodiment

Figure 4:
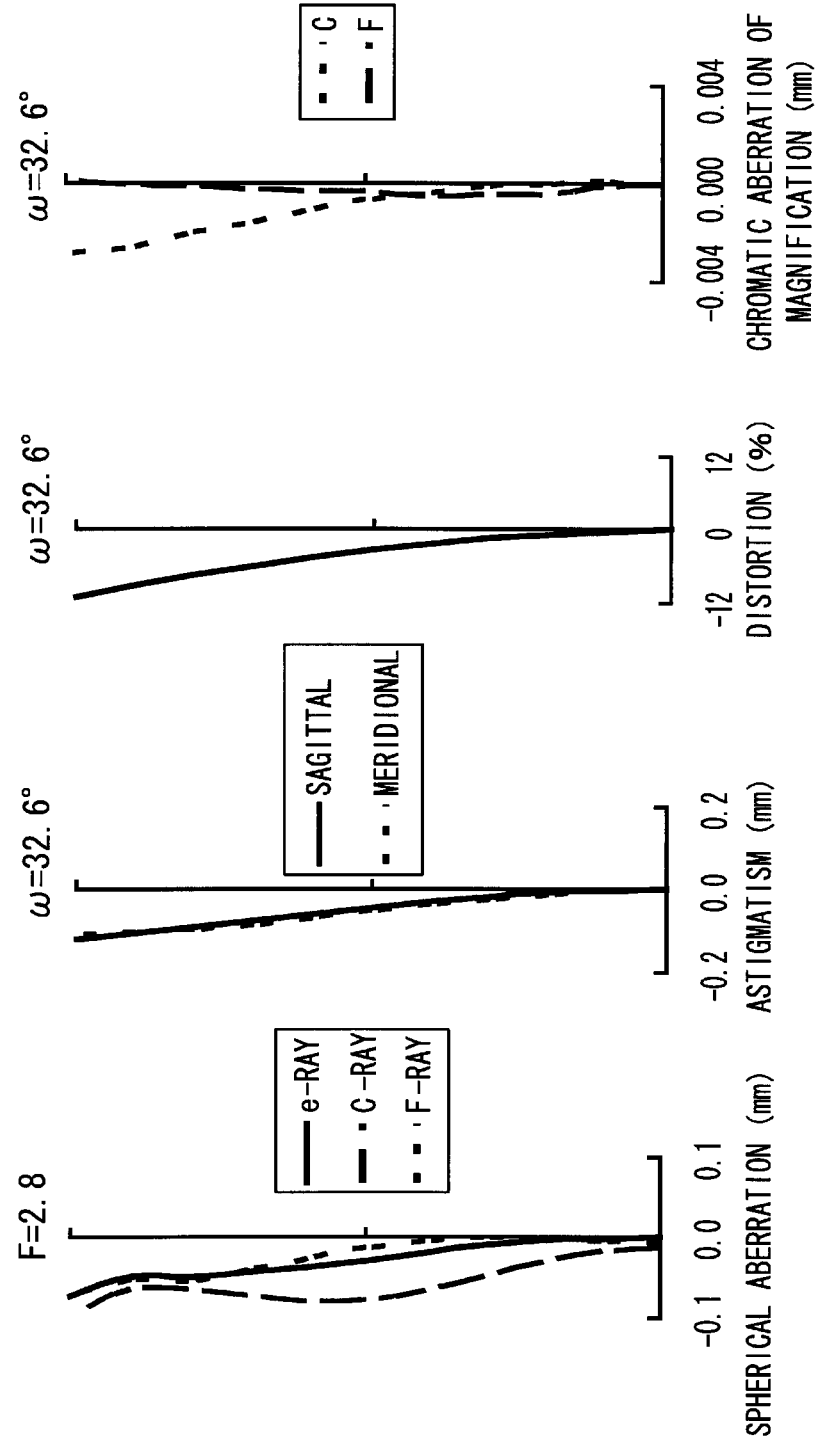
FIG. 4 includes aberration diagrams of an imaging lens in accordance with a third embodiment.

FIG. 4 includes aberration diagrams of a third embodiment. An imaging lens in accordance with the third embodiment has a lens construction substantially identical to that in accordance with the first embodiment. Although a polycarbonate resin that brings about large dispersion is used as a lens material, an axial chromatic aberration and a chromatic aberration of magnification are properly compensated.

Table 5 lists radii of curvature R (mm) of lenses employed in the third embodiment, surface spaces d (mm) on the optical axis of surfaces thereof, refractive indices $N_d$ relative to a d-line of lens materials thereof, and Abbe numbers $\upsilon_d$ thereof. In addition, a focal length f of an entire system of the third embodiment, an F-number thereof, a half angle of view ω thereof, and values corresponding to the conditional expressions (1) and (2) thereof are listed below Table 5.

TABLE 5

| Surface | R | d | $N_d$ | $\upsilon_d$ |
|---|---|---|---|---|
| 1 Lens frame | ∞ | 0.0580 | | |
| 2 (aspherical surface) | −1.8688 | 0.1659 | 1.58371 | 30.2 |
| 3 Stop | ∞ | 0.3989 | 1.58371 | 30.2 |
| 4 (diffractive optical surface) | −0.7377 | 0.5000 | | |
| 5 | ∞ | 0.4000 | 1.51680 | 64.2 |
| 6 | ∞ | (0.9297) | | | f = 1.564
Fno = 2.8
ω = 32.6°
L/R = 0.541
L' (1 − n)/R' = 0.0518

Table 6 lists values of aspherical coefficients employed in the third embodiment, and values of constants of an optical path difference function on a diffractive optical surface therein.

TABLE 6

| Aspherical surface (second surface) Aspherical coefficient | |
|---|---|
| K = | −5.6066 |
| $A_4$ = | −1.1622544 |
| $A_6$ = | 9.5177658 |
| $A_8$ = | 197.14112 |
| $A_{10}$ = | 1295.9297 |
| $A_{12}$ = | −3111.1850 |
| Diffractive optical surface (fourth surface) Aspherical coefficient | |
| K = | 2.9508 |
| $A_4$ = | 3.4023102 |
| $A_6$ = | −60.413141 |
| $A_8$ = | 679.46467 |
| $A_{10}$ = | −3380.1764 |
| $A_{12}$ = | 10578.080 |
| Optical path difference function coefficient | |
| $B_2$ = | 55.336852 |
| $B_4$ = | 2985.4521 |
| $B_6$ = | 69054.225 |
| $B_8$ = | 587186.92 |
| Optimal wavelength for the optical path difference function | |
| $\lambda_0$ = | 546 nm |

Fourth Embodiment

Figure 5:
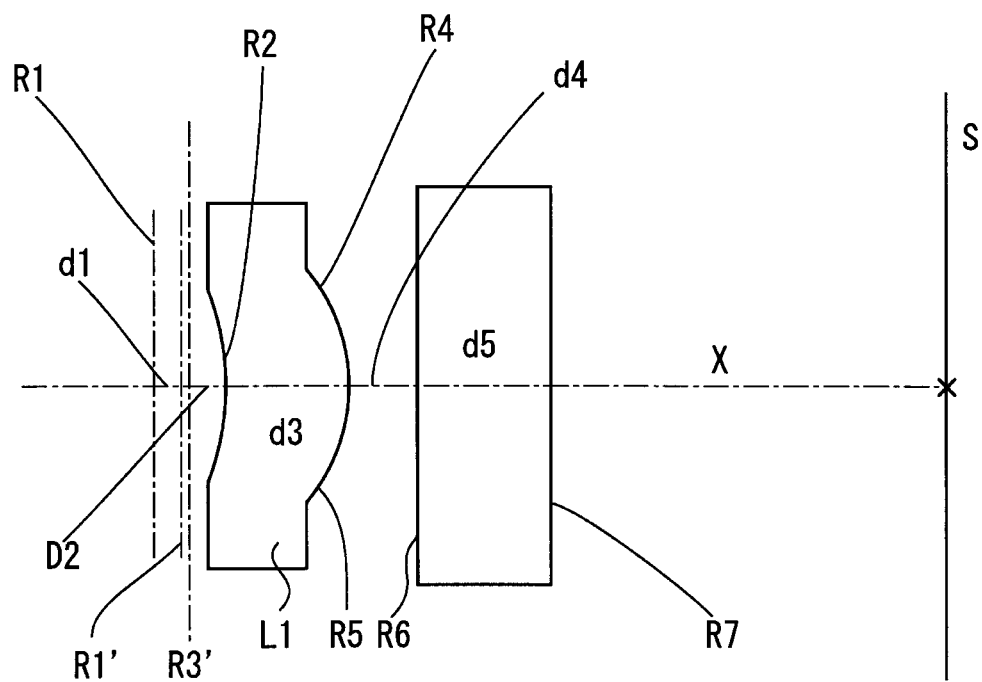
FIG. 5 is a construction diagram of an imaging lens in accordance with a fourth embodiment.
Figure 6:
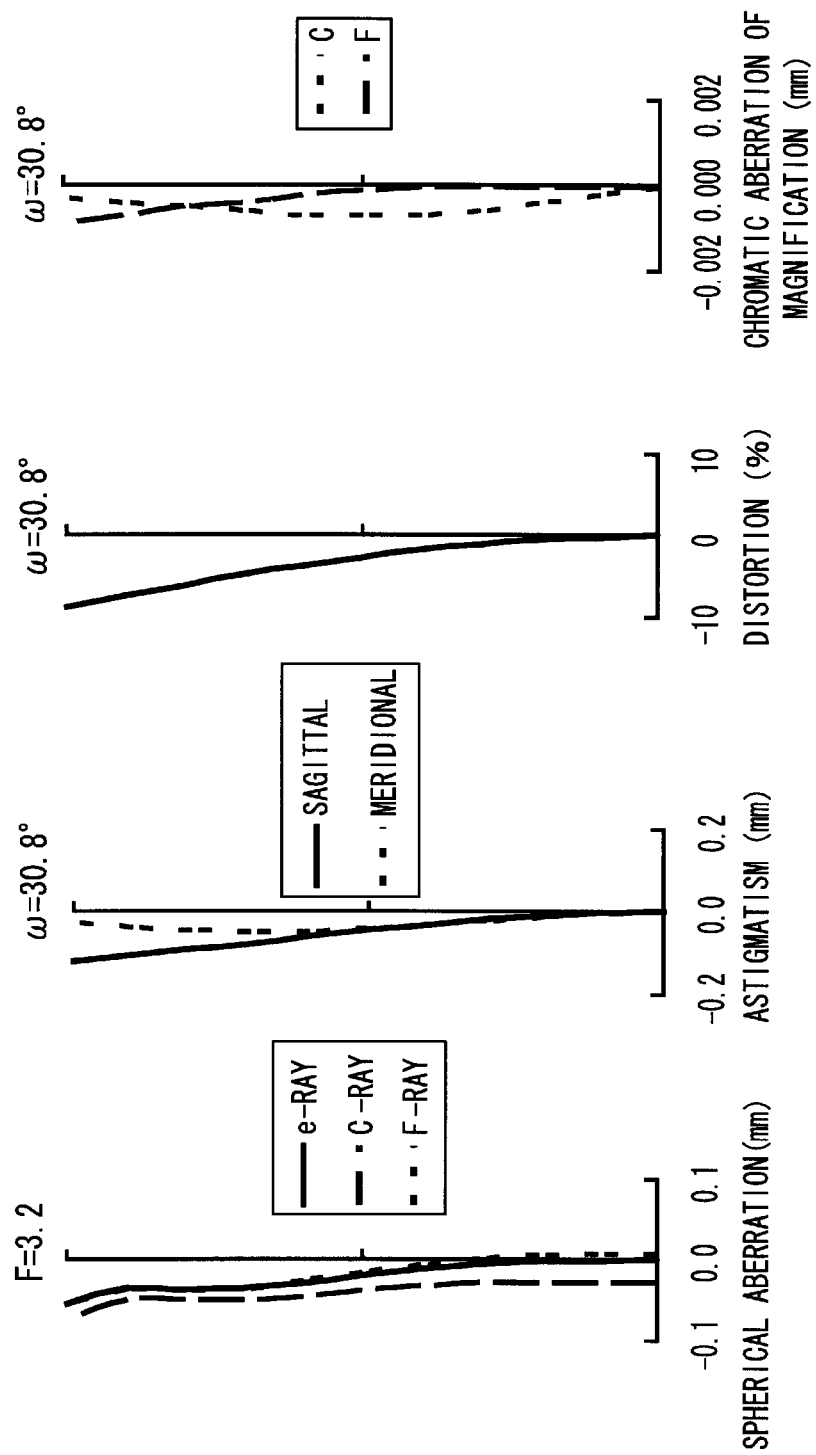
FIG. 6 includes aberration diagrams of the imaging lens in accordance with the fourth embodiment.

FIG. 5 and FIG. 6 show a fourth embodiment of the present invention. FIG. 5 is a construction diagram of an imaging lens, and FIG. 6 includes aberration diagrams. The imaging lens in accordance with the fourth embodiment shown in FIG. 5 has substantially the same lens construction as that in accordance with the first embodiment. An apparent stop R3' is provided on the object side of the imaging lens L1.

Table 7 lists radii of curvature R (mm) of lenses of the fourth embodiment, surface spaces d (mm) on the optical axis of surfaces thereof, refractive indices $N_d$ relative to a d-line of lens materials thereof, and Abbe numbers $\upsilon_d$ thereof. In addition, a focal length f of an entire system of the fourth embodiment, an F-number thereof, a half angle of view ω thereof, and values corresponding to the conditional expressions (1) and (2) thereof are listed below Table 7.

TABLE 7

| Surface | R | d | $N_d$ | $\upsilon_d$ |
|---|---|---|---|---|
| 1 Lens frame | ∞ | 0.0800 | | |
| 2 Stop | ∞ | 0.1165 | | |
| 3 (aspherical surface) | −1.0957 | 0.3782 | 1.52511 | 56.2 |
| 4 (diffractive optical surface) | −0.5779 | 0.5000 | | |
| 5 | ∞ | 0.4000 | 1.51680 | 64.2 |
| 6 | ∞ | (1.0384) | | | f = 1.641
Fno = 3.2
ω = 30.8°
L = −0.4885
L/R = 0.845
L' (1 − n)/R' = −0.0559

Table 8 lists values of aspherical coefficients employed in the fourth embodiment and values of constants of an optical path difference function on a diffractive optical surface therein.

TABLE 8

| Aspherical surface (third surface) Aspherical coefficients | |
|---|---|
| K = | 0.0000 |
| $A_4$ = | −1.9937170 |
| $A_6$ = | 5.6980870 |
| $A_8$ = | −261.38828 |
| $A_{10}$ = | 965.08382 |
| Diffractive optical surface (Fourth surface) Aspherical coefficients | |
| K = | 0.3217 |
| $A_4$ = | −1.0269463 |
| $A_6$ = | −1.2160280 |
| $A_8$ = | −5.6471164 |
| $A_{10}$ = | −67.406459 |
| Optical path difference function coefficients | |
| $B_2$ = | −56.712045 |
| $B_4$ = | 312.00764 |
| $B_6$ = | −1792.4821 |
| Optimal wavelength for the optical path difference function | |
| $\lambda_0$ = | 546 nm |

Figure 7:
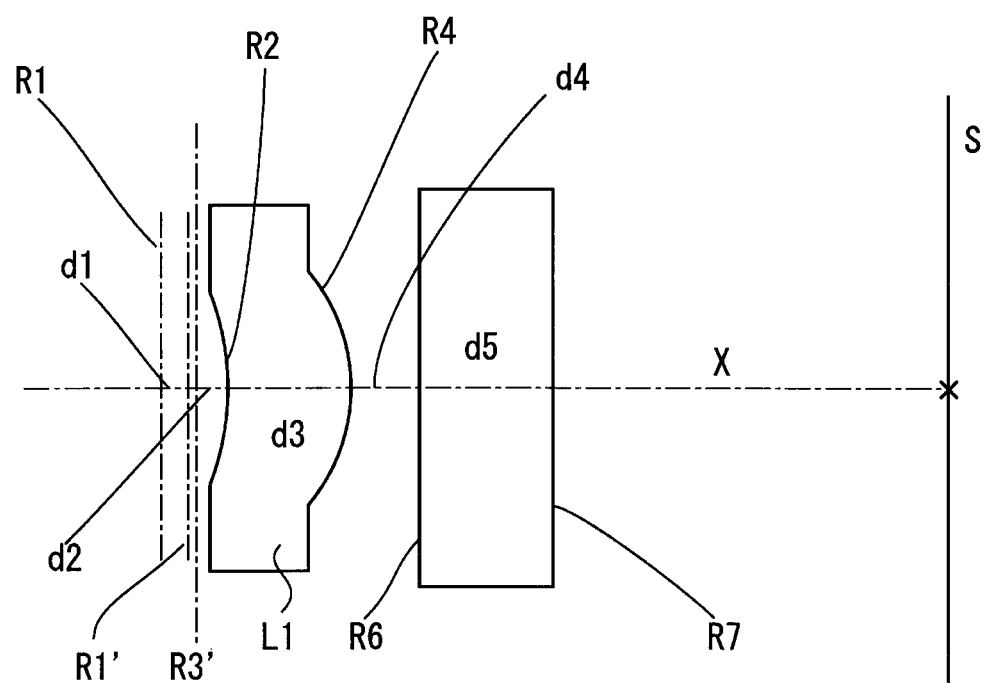
FIG. 7 is a construction diagram of an imaging lens of a one-piece construction devoid of a diffractive optical surface.

In order to numerically clarify the advantage of the first to fourth embodiments, a typical plastic aspherical lens of a one-piece construction devoid of a diffractive optical surface will be described below with reference to the construction diagram of the imaging lens of FIG. 7, the aberration diagrams of FIG. 8, and Tables 9 and 10 presented below. Specifically, an imaging lens shown in FIG. 7 has a construction similar to that of the fourth embodiment. However, a convex surface R4 is not the diffractive optical surface but is a typical aspherical surface described in Mathematics 1.

Table 9 lists radii of curvature R (mm) of lenses, surface spaces d (mm) on the optical axis of surfaces, refractive indices $N_d$ relative to a d-line of lens materials, and Abbe numbers $\upsilon_d$. In addition, a focal length f of an entire system, an F-number, a half angle of view ω, and values corresponding to the conditional expressions (1) and (2) are listed below Table 9.

TABLE 9

| Surface | R | d | $N_d$ | $\upsilon_d$ |
|---|---|---|---|---|
| 1 Lens frame | ∞ | 0.0780 | | |
| 2 Stop | ∞ | 0.1277 | | |
| 3 (aspherical surface) | −1.1244 | 0.3512 | 1.52511 | 56.2 |
| 4 (aspherical surface) | −0.5277 | 0.5000 | | |
| 5 | ∞ | 0.4000 | 1.51680 | 64.2 |
| 6 | ∞ | (0.9483) | | | f = 1.565
Fno = 2.8
ω = 32.5°
L = −0.4717
L/R = 0.894
L' (1 − n)/R' = −0.0596

TABLE 10

| Aspherical surface (third surface) Aspherical coefficients | |
|---|---|
| K = | 0.0000 |
| $A_4$ = | −1.9937170 |
| $A_6$ = | 5.6980870 |
| $A_8$ = | −261.38828 |
| $A_{10}$ = | 965.08382 |
| $A_{12}$ = | −36247.406 |
| Aspherical surface (fourth surface) Aspherical coefficients | |
| K = | −0.9350 |
| $A_4$ = | −1.0848882 |
| $A_6$ = | −2.9618021 |
| $A_8$ = | −57.737091 |
| $A_{10}$ = | 598.69595 |
| $A_{12}$ = | −2682.3836 |

Figure 8:
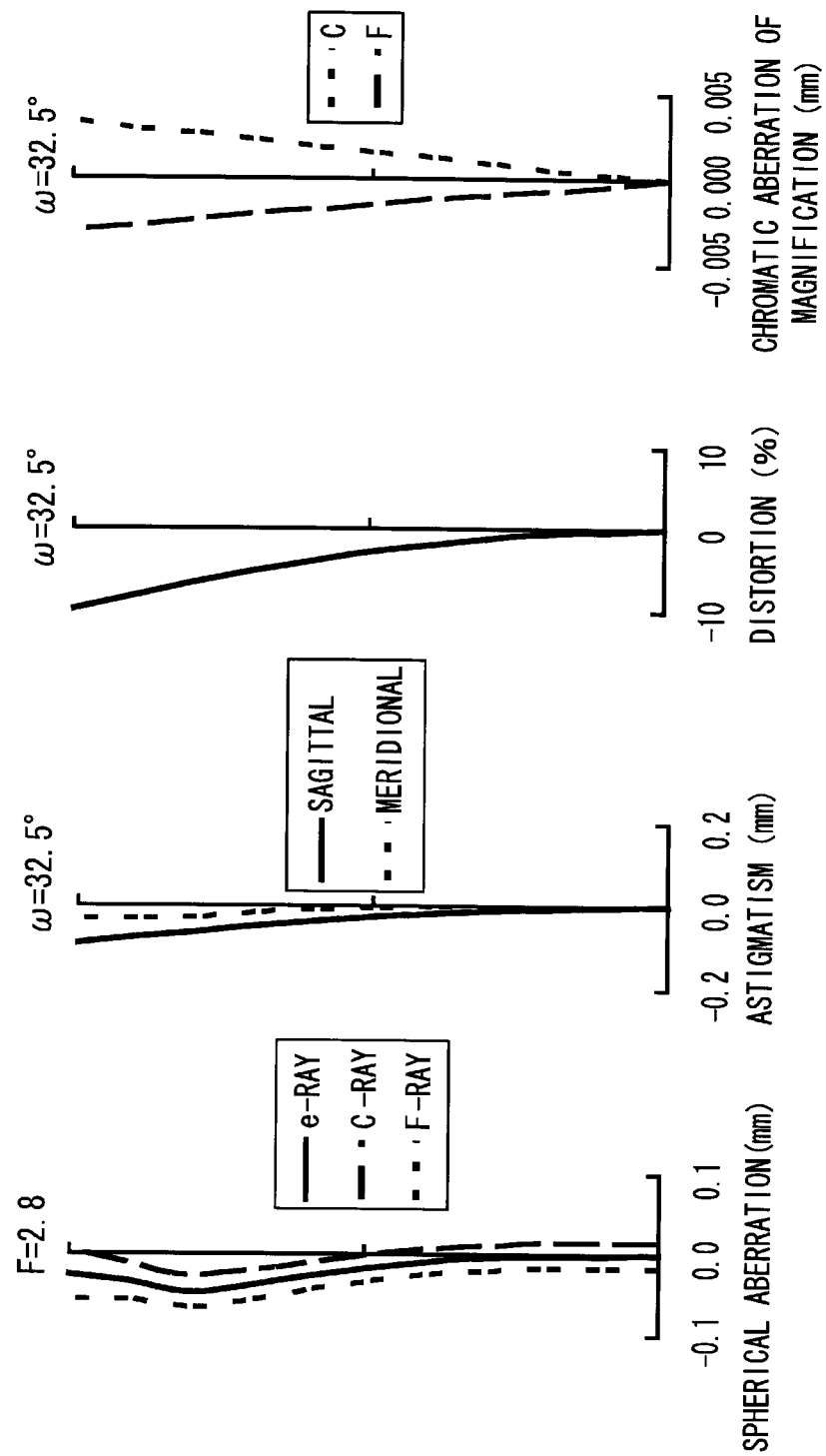
FIG. 8 includes aberration diagrams of the imaging lens of the one-piece construction devoid of the diffractive optical surface.

As shown in FIG. 8, a spherical aberration, a curvature of field, and a distortion are compensated to be on a level with those in the embodiments of the present invention, but compensation of both an axial chromatic aberration and a chromatic aberration of magnification does not reach the level of compensation by the first to fourth embodiments of the present invention.

As mentioned above, according to an imaging lens of the present invention, once a diffractive optical surface R5 is located at an optimal position, chromatic aberrations and other aberrations can be compensated to be a practical level despite a minimum number of pieces that is one piece. A low-cost lens that is superb in production efficiency can be provided. In particular, the present invention provides a great advantage in the field of an imaging lens that is mounted in a portable cellular phone and is requested to be compact and inexpensive.

An imaging lens of the present invention can be made compact, is easy to manufacture, and can reduce a cost because a lens system is constructed with a minimal number of pieces. Further, a Petzval sum can be decreased by placing a concave surface, which has a negative power, for the purpose of compensating a curvature of field, and an exit angle of a chief ray from the lens can be optimized by locating a convex surface, which has a positive power, at a position appropriately away from a stop in an image-plane direction. Further, when a diffractive optical surface having a chromatic dispersion ability is optimally placed, chromatic aberrations can be compensated and a curvature of field can be effectively compensated to a permissible extent.

As for the distance between the stop and convex surface, there is a certain optimal value that is defined by the conditional expression (1). When a ratio of a distance L between an apparent stop position and the convex surface to a radius of curvature R of the convex surface, L/R, gets smaller than 0.45, it becomes hard to simultaneously compensate an axial chromatic aberration and a chromatic aberration of magnification. In contrast, when the L/R gets larger than 0.95, although there is room for compensation of the chromatic aberrations by the diffractive optical surface, a distortion increases and an entire optical system gets elongated. This is regressive against a request for compactness. Incidentally, the diffractive optical surface brings about a decrease in a contrast because of second-order diffraction and third-order diffraction due to degradation of diffraction efficiency. The diffraction efficiency other than a designed reference wavelength can be minimized by optimizing an optical path difference function, and the contrast can be improved through electric processing involving an image sensor and successive elements.

As for the distance between the stop and concave surface, there is a certain optimal value that is defined by the conditional expression (2). The conditional expression (2) implies the positional relationship between the concave surface and stop, and provides a quantity needed to retain a coma properly and reduce the length of an entire system. The conditional expression (2) normalizes a distance to an apparent stop by a refractive index and divides the resultant value by a refraction force of the concave surface. If the value of L'(1−n)/R' gets larger than 0.035 n, an incident angle of an off-axis ray entering the concave surface increases, and the coma therefore increases. If the value gets larger in a negative direction than −0.065, it is more preferable in terms of aberration compensation. However, when an exit angle of a chief ray gets smaller and deviates from an optimal value, the entire system gets elongated. This is regressive against a request for compactness.

What is claimed is:

1. An imaging lens comprising:
a control member that adjusts an amount of light incident on a lens; and
a one-piece plastic lens, wherein
the control member and one-piece plastic lens are placed in that order from the side of an object;
a concave surface is formed on the object side of the lens, and a convex surface is formed on the image-point side thereof;
the surfaces are constructed with aspherical surfaces; and
the convex surface is a diffractive optical surface that exerts a chromatic dispersion ability,
wherein a conditional expression (1) below is satisfied:

$$0.45 < L/R \leq 0.573 \tag{1}$$

where L denotes a distance to an apparent stop seen from the apex of the convex surface on the assumption that a position at which a chief ray and an optical axis intersect is regarded as the apparent stop, and R denotes a curvature radius of the convex surface.

2. The imaging lens according to claim 1, wherein:
in a coordinate system in which an object direction from a reference point is negative and an image-plane direction is positive, optical elements are constructed to meet a conditional expression (2) presented below:

$$-0.065 < L'(1-n)/R' < 0.035n \tag{2}$$

where L' denotes a distance to the apparent stop seen from the apex of the concave surface on the assumption that the position at which the chief ray and optical axis intersect is regarded as the apparent stop, R' denotes a curvature radius of the concave surface, and n denotes a refractive index of a lens material.

* * * * *